United States Patent [19]

Tabor et al.

[11] Patent Number: 4,684,576

[45] Date of Patent: Aug. 4, 1987

[54] MALEIC ANHYDRIDE GRAFTS OF OLEFIN POLYMERS

[75] Inventors: Ricky L. Tabor; James A. Allen, both of Lake Jackson, Tex.

[73] Assignee: The Dow Chemical Company, Midland, Mich.

[21] Appl. No.: 825,161

[22] Filed: Feb. 3, 1986

Related U.S. Application Data

[62] Division of Ser. No. 641,087, Aug. 15, 1984, abandoned.

[51] Int. Cl.⁴ .................. B32B 17/10; B32B 15/08; B32B 21/08; B32B 27/06
[52] U.S. Cl. ................................ 428/441; 428/457; 428/461; 428/474.4; 428/475.5; 428/476.9; 428/511; 428/515; 428/516; 525/74; 525/222

[58] Field of Search ............... 525/74, 222; 428/457, 428/461, 500, 441, 474.4, 475.5, 516, 515, 511, 476.9

[56] References Cited

U.S. PATENT DOCUMENTS

| | | | |
|---|---|---|---|
| 3,658,948 | 4/1972 | McConnell | 525/74 |
| 4,087,587 | 5/1978 | Shida et al. | 525/74 |
| 4,230,830 | 10/1980 | Tanny et al. | 525/222 |
| 4,394,485 | 7/1983 | Adur | 525/74 |
| 4,460,745 | 7/1984 | Adur et al. | 525/74 |
| 4,487,885 | 12/1984 | Adur et al. | 525/74 |

*Primary Examiner*—Thomas J. Herbert

[57] ABSTRACT

Succinic acid or succinic anhydride grafts of HDPE are blended with ungrafted LLDPE and with ungrafted LDPE to form blends having useful adhesive properties. The succinic acid or succinic anhydride groups are provided by grafting, respectively, maleic acid or maleic anhydride onto HDPE. Laminates of the blends on various metals and polymers are shown.

28 Claims, No Drawings

MALEIC ANHYDRIDE GRAFTS OF OLEFIN POLYMERS

CROSS-REFERENCE TO RELATED APPLICATION

This is a divisional of application Ser. No. 641,087, filed Aug. 15, 1984, now abandoned.

FIELD OF THE INVENTION

Maleic acid or maleic anhydride is grafted onto high density polyethylene (HDPE), giving rise to succinic acid or succinic anhydride groups along the polymer chain. These grafted polymers are useful in blends with other olefin polymers.

BACKGROUND OF THE INVENTION

Grafting of unsaturated monomer molecules onto olefin polymers and copolymers has been disclosed in a number of patents. The grafting technique has been used to impart changes in the polymer to which the grafted molecules are attached.

With respect to the invention described and claimed in this application, it is believed that the following patents are representative of the most relevant prior art on grafting of which we are aware: U.S. Pat. No. 2,970,129; U.S. Pat. No. 3,177,269; U.S. Pat. No. 3,270,090; U.S. Pat. No. 3,873,643; U.S. Pat. No. 3,882,194; U.S. Pat. No. 3,886,227; U.S. Pat. No. 4,087,587; U.S. Pat. No. 4,087,588; U.S. Pat. No. 4,239,830; U.S. Pat. No. 4,298,712; U.S. Pat. No. 4,394,485; U.K. Pat. No. 2,081,723; Jap. Kokai No. 49(1973)-129742.

The principal distinctions between low density polyethylene (LDPE), high density polyethylene (HDPE), and linear low density polyethylene copolymer (LLDPE) are well-known to practitioners of the polyethylene art and are described, e.g., in U.S. Pat. No. 4,327,009.

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone" and they are also generally known as high density polyethylene (HDPE). It is these "linear" polymers to which the present invention pertains. Linear polyethylene ethylene (HDPE) ordinarily has a density in the range of 0.941 to 0.965 gms/cc.

In some of the blends of the present invention there is used a "linear" type ethylene polymer wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in the same density range as LDPE, due to the alkyl sidechains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the higher alkene comonomers impart high "cling" and "block" characteristics to extrusion-cast films and the high "slip" characteristic inherently found in HDPE is diminished.

The use of coordination-type catalysts for polymerizing ethylene into homopolymers (which we call "HDPE" polymers) and/or for copolymerizing ethylene with higher alkenes to make copolymers (which we call "LLDPE" copolymers) is disclosed variously in, e.g., U.S. Pat. No. 2,699,457; U.S. Pat. No. 2,862,917; U.S. Pat. No. 2,905,645; U.S. Pat. No. 2,846,425; U.S. Pat. No. 3,058,963; and U.S. Pat. No. 4,076,698.

SUMMARY OF THE INVENTION

High density polyethylene (HDPE) having succinic acid or succinic anhydride groups grafted thereof is blended with other olefin polymers, i.e., LDPE or LLDPE, especially LLDPE, to produce blends having enhanced adhesive properties.

DETAILED DESCRIPTIONS

The high density polyethylene polymer (HDPE) for use in the present invention is a normally solid, high molecular weight polymer prepared using a coordination-type catalyst in a process wherein ethylene is homopolymerized.

The LLDPE copolymer may have a density in the range of about 0.88 g/cc to about 0.935 g/cc, preferably about 0.90 g/cc to about 0.925 g/cc. It is evident to practitioners of the relevant arts that the density will depend, in large part, on the particular alkene(s) used as comonomer(s) and on the amount of said alkene(s) incorporated into the copolymer. The alkene(s) copolymerized with ethylene to make LLDPE comprises a minor amount of at least one olefinically unsaturated alkene of from $C_3$–$C_{12}$, most preferablty from $C_4$–$C_8$; 1-octene is especially preferred. The amount of said alkene may constitute about 0.5% to about 35% by weight of the copolymer, preferably about 1% to about 20%, most preferably about 2% to about 15%.

The LLDPE copolymer may have a melt flow value (MFV) in the range of about 0.1 gm/10 min to about 2000 gm/10 min as measured in accordance with ASTM D-1238(E). Preferably the melt flow value is in the range of about 0.5 gm/10 min to about 120 gm/10 min, most preferably about 0.7 gm/10 min to about 40 gm/10 min. Practitioners of the relevant arts are aware that the melt flow value is inversely related to the molecular weight of the polymer.

The LDPE which is blended with the grafted HDPE in accordance with the present invention is characterized as having a melt flow value in the range of about 0.5 gms/10 min to about 120 gms/10 min according to ASTM D-1238(E) and a density in the range of about 0.90 g/cc to about 0.935 g/cc, preferably a MFV of about 0.7 gms/10 min to about 40 gms/10 min and a density of about 0.91 to about 0.93 g/cc.

The HDPE which is used in making the grafted HDPE in accordance with the present invention is characterized as having a melt flow value in the range of about 0.1 g/10 min to about 500 g/10 min according to ASTM D-1238(E) and a density in the range of about 0.94 g/cc to about 0.965 g/cc, preferably a MFV of about 0.5 to about 150 gms/10 min and a density of about 0.945 to about 0.960 g/cc. The anhydride or acid groups generally comprise about 0.0001 to about 10 wt. percent, preferably about 0.01 to about 5 wt. percent.

The ratio of grafted-HDPE/polyolefin (i.e. LDPE or LLDPE) of the present blend is in the range of about 0.5/99.5 to about 99.5/0.5, preferably about 3/97 to about 50/50.

The maleic acid and maleic anhydride compounds are known in these relevant arts as having their olefin unsaturation sites conjugated to the acid groups, in contradistinction to the fused ring and bicyclo structures of the non-conjugated unsaturated acids of, e.g., U.S. Pat. No. 3,873,643 and U.S. Pat. No. 3,882,194 and the like. Fumaric acid, like maleic acid of which it is an isomer, is also conjugated. Fumaric acid, when heated, gives off water and rearranges to form maleic anhydride, thus is operable in the present invention.

The grafting of the succinic acid or succinic anhydride groups onto ethylene polymers may be done by methods described in the art, which involve reacting maleic acid or maleic anhydride in admixture with heated polymer, generally using a peroxide or free-radical initiator to expedite the grafting.

Grafting may be effected in the presence of oxygen, air, hydroperoxides, or other free radical initiators, or in the essential absence of these materials when the mixture of monomer and polymer is maintained under high shear in the absence of heat. A convenient method for producing the graft copolymer is the use of extrusion machinery, however, Brabender mixers or Banbury mixers, roll mills and the like may also be used for forming the graft copolymers.

We prefer to employ a twin-screw devolatilizing extruder (such as a Werner-Pfleider twin-screw extruder) wherein maleic acid (or maleic anhydride) is mixed and reacted with the LLDPE at molten temperatures, thereby producing and extruding the grafted polymer. The so-produced grafted polymer is then blended, as desired, with LDPE or LLDPE to produce the blends of this invention.

The following described methods and tests are used in testing the polymers and blends in the following examples.

Molding of Test Specimens

On a 9"×6" compression molder having two platens set at 350° F. and two platens water cooled, is molded a 25 mil plaque of the material to be tested for adhesion. An appropriate amount of material to be molded is placed in the 25 mil mold between two sheets of Mylar, which, in turn is between two metal plates (support plates). The support plates containing the resin and mold are placed between the 350° F. platens of the compression molder and the platens are closed and allowed to heat with no pressure for one minute. After this time period, 10,000 lbs. platen pressure are applied for one minute. The support plates containing the mold and polymer are then removed and placed in the water cooled section for one minute. The Mylar is removed and the polymer may be cut from the mold using a razor blade against a clean, hard surface.

Adhering Test Specimen to Substrate

The molded specimen (9"×6") is placed against a substrate (at least 9"×6") with a Mylar film tab (3"×9") centered in transverse manner between the test specimen and substrate, leaving about 1.5" of the tab protruding from each side of the so-formed "sandwich". Then a Mylar film (12"×12") is placed on each side of the specimen/substrate sandwich and a steel support plate and placed against each of the Mylar films. ("Mylar" is the well-known DuPont tradename for polyethyleneterephthalate). The sandwich structure described above is placed between the hot (177° C.) platens of a compression molder and pressed immediately to 10,000 psi and held there for two minutes. After this, the sandwich is removed from the hot platens and placed between the cool platens for two minutes. The sandwich is removed from the press and the Mylar film is removed from each side of the polymer/substrate laminate.

The laminate is then cut into 5 equal 1" wide strips by cutting longitudinally. Each of five test strips are slightly peeled back by hand, then are mounted (clamped) in the Instron tensile tester. The Instron is run at a pulling rate of 2"/min at a free hanging peel angle and the tensile force is recorded on a strip chart until about 2–3 inches have been peeled. The average of the five peels is taken as the adhesion in pounds per inch.

The following examples are provided as illustrations of various embodiments, but the invention is not limited to the embodiments shown.

DESCRIPTION OF SUBSTRATES

Electrolytic chromium coated steel had a thickness of 6 mils; this steel was chosen due to its popular use in polyolefin applications.

The aluminum which is used below is coiled aluminum 5 mils thick, 18" wide, grade 3003-H14.

The copper which is used below is copper sheet 110 alloy, fully annealed, 99% pure, 5 mils thick.

The nylon-6 used below is a film 5 mils thick and 20 inches wide.

The oriented polypropylene (OPP) used below is a film grade 1 mil thick and 6 inches wide.

The non-oriented polypropylene (pp) film used below is 5 mils thick, 6 inches wide.

EXAMPLE 1

(Blend of grafted HDPE with, respectively, LDPE, LLDPE and ungrafted HDPE for comparison purposes)

A HDPE homopolymer (the "base" polymer), melt flow value (MFV) of about 0.83 g/10 min (ASTM D-1238(E)) and density of 0.965 g/cc, is extruded with maleic anhydride (3.0 phr) and dicumyl peroxide (0.3 phr) at an average melt temperature of 225° C. (range about 180°–250° C.) using a Werner-Pfleiderer twin-screw devolitization extruder. The final incorporated concentration of maleic anhydride is 0.5% by weight (as determined by titration) and has a MFV of about 0.5 gm/10 min; this is called the MAH-grafted HDPE.

Using a 6-inch Farrell two-roll mill, 250 gm samples are blended having compositions ranging from 5% MAH-grafted HDPE to 50% MAH-grafted HDPE in LLDPE in various HDPE resins, and in LDPE, at a melt temperature of 170° C. The blends are adhered to a variety of substrates and tested for adhesion by the methods described supra. The results are displayed in Tables I–V, where adhesion is given in lbs/in.

TABLE I

ADHESION OF BLENDS OF MAH-GRAFTED HDPE WITH HDPE

| Blend | Steel | Copper | Alum | Nylon | OPP | PP |
|---|---|---|---|---|---|---|
| Control, 100% HDPE* | 0.19 | 0.00 | 0.00 | 0.04 | 0.17 | 1.58 |
| 10% MAH-Grafted HDPE | 12.5 | 0.67 | 0.77 | 8.6 | >1.53 | 0.18 |
| 20% MAH-Grafted HDPE | 14.8 | 1.56 | 1.79 | 4.58 | 1.33 | 1.12 |
| 40% MAH-Grafted HDPE | 16.7 | 0.86 | 2.18 | 1.54 | 1.5 | 1.17 |
| Control, 100% MAH-Grafted HDPE | 18.9 | 1.0 | 9.3 | 0.3 | 1.4 | 0.9 |

*0.83 MFV, 0.9658 density

TABLE II

ADHESION OF BLENDS OF MAH-GRAFTED HDPE WITH LLDPE

| Blend | Steel | Copper | Alum | Nylon | OPP | PP |
|---|---|---|---|---|---|---|
| Control, 100% LLDPE* | 0.17 | 0.0 | 0.0 | 0.25 | 1.44 | 0.32 |
| 10% MAH-Grafted HDPE | 12.0 | 5.0 | 6.9 | 16.8 | 0.8 | 0.12 |
| 20% MAH-Grafted HDPE | >36.0 | 8.1 | 14.2 | 13.6 | 1.03 | 0.15 |
| 40% MAH-Grafted HDPE | 32.2 | 7.0 | 14.7 | 6.8 | 1.21 | 0.17 |
| Control, 100% MAH-Grafted HDPE | 18.9 | 1.0 | 9.3 | 0.3 | 1.4 | 0.9 |

*7% 1-octene, 5.98 MFV, 0.918 density

TABLE III

ADHESION OF MAH-GRAFTED HDPE BLENDED WITH EDPE

| Blend | Steel | Copper | Alum | OPP | PP |
|---|---|---|---|---|---|
| Control, 100% HDPE* | 0 | 0 | 0 | 0.89 | 1.05 |
| 5% MAH-Grafted HDPE | 0 | 0.15 | 0 | 1.35 | 1.02 |
| 10% MAH-Grafted HDPE | 0.43 | 0.32 | 0.00 | 1.14 | 0.87 |
| 20% MAH-Grafted HDPE | 12.3 | 0.80 | 3.14 | 0.98 | 0.94 |
| 50% MAH-Grafted HDPE | 20.0 | 0.78 | 4.49 | 0.93 | 0.68 |
| Control, 100% MAH-Grafted HDPE | 18.9 | 1.00 | 9.30 | 1.40 | 0.90 |

*5.15 MFV, 0.965 density

TABLE IV

ADHESION OF MAH-GRAFTED HDPE BLENDED WITH LDPE

| Blend | Steel | Copper | Alum | OPP | PP |
|---|---|---|---|---|---|
| Control, 100% LDPE* | 0 | 0 | 0 | 0.06 | 0.04 |
| 5% MAH-Grafted HDPE | 17.6 | 1.88 | 15.84 | 0.05 | 0.03 |
| 10% MAH-Grafted HDPE | 10.28 | 2.10 | 7.32 | 0.05 | 0.05 |

TABLE IV-continued

ADHESION OF MAH-GRAFTED HDPE BLENDED WITH LDPE

| Blend | Steel | Copper | Alum | OPP | PP |
|---|---|---|---|---|---|
| 20% MAH-Grafted HDPE | 4.56 | 2.70 | 4.11 | 0.08 | 0.60 |
| 50% MAH-Grafted HDPE | 8.0 | 2.41 | 7.49 | 0.13 | 0.13 |
| Control, 100% MAH-Grafted HDPE | 18.9 | 1.00 | 9.30 | 1.40 | 0.90 |

*5.87 MFV, 0.923 density

TABLE V

ADHESION OF MAH-GRAFTED HDPE BLENDED WITH LLDPE

| Blend | Steel | Copper | Alum | OPP | PP |
|---|---|---|---|---|---|
| Control, 100% LLDPE* | 0 | 0 | 0 | 0.32 | 0.14 |
| 5% MAH-Grafted HDPE | 3.10 | 0.93 | 0.75 | 0.41 | 0.12 |
| 10% MAH-Grafted HDPE | 24.58 | 3.92 | 6.44 | 0.34 | 0.85 |
| 20% MAH-Grafted HDPE | 26.48 | 5.80 | 17.78 | 0.27 | 0.10 |
| 50% MAH-Grafted HDPE | 26.00 | 3.10 | 13.24 | 0.33 | 0.18 |
| Control, 100% MAH-Grafted HDPE | 18.9 | 1.00 | 9.30 | 1.40 | 0.90 |

*24 MFV, 0.921 density, 10% 1-octene

The MAH-grafted HDPE copolymers of the present invention are useful alone in many applications wherein their adhesive properties and their strength properties offer an advantage to the user and are also useful as a blend component in improving the adhesive properties of other polymers, especially polyolefins such as LLDPE, LDPE, HDPE, PP, OPP, and the like and are particularly useful as a blend component for improving the adhesive properties of LLDPE and LDPE. The polymers and blends of the present invention are useful for extrusion coating of articles, such as metals, polymer films, paper, wood, or glass, and as adhesive or barrier layers in multilayer films, as adhesive layers in packaging, as laminate adhesives, as hot melt coatings or adhesives, as wire and cable interlayers, and in other applications where the thermoplasticity, the processability, the tenacity and/or the adhesiveness is utilized.

We claim:

1. A blend consisting of grafted high density polyethylene, HDPE, with ungrafted LLDPE copolymer, having a density in the range of 0.88 to 0.935 g/cc, or ungrafted LDPE, having a density in the range of 0.91 to 0.93 g/cc,
    wherein the grafted HDPE consists essentially of HDPE, having initially a density in the range of 0.94 to 0.965 g/cc, which has been grafted with maleic acid or maleic anhydride, thereby providing succinic acid or succinic anhydride groups grafted along the HDPE polymer chain,
    said blend being in the form of a layer adhered to at least part of at least one substrate.

2. The laminate structure comprising at least one substrate having adhered to at least a portion thereof a blend of grafted HDPE and ungrafted LLDPE copolymer,
    said grafted HDPE consisting of HDPE which has been grafted with maleic acid or maleic anhydride, thereby providing succinic acid or succinic anhydride groups grafted along the HDPE polymer chain, and wherein the ungrafted LLDPE has a density in the range of about 0.90 g/cc to about 0.925 g/cc and has a $C_4$-$C_8$ alkene comonomer content of about 1% to about 20% by weight.

3. The laminate structure of claim 2 wherein the alkene comonomer comprises 1-octene.

4. A laminate structure comprising at least one substrate having adhered to at least a portion thereof a blend consisting of grafted HDPE/ungrafted LLDPE copolymer, having a density in the range of 0.88 to 0.935 g/cc, or a blend of grafted HDPE/ungrafted LDPE, having a density in the range of 0.91 to 0.93 g/cc, wherein the grafted HDPE consists of HDPE, having initially a density in the range of 0.94 to 0.965 g/cc, which has been grafted with maleic acid or maleic anhydride, thereby providing succinic acid or succinic anhydride groups grafted along the HDPE polymer chain.

5. The laminate structure of claim 4 wherein at least one substrate consists of a metal, paper, wood, glass, or polymer material.

6. The laminate of claim 4 wherein the blend comprises grafted HDPE and ungrafted LLDPE copolymer wherein the LLDPE copolymer is one having a density in the range of about 0.88 g/cc to about 0.935 g/cc, containing about 0.5% to about 35% by weight of a $C_3$-$C_{12}$ alkene comonomer.

7. The laminate of claim 4 wherein the blend comprises grafted HDPE and ungrafted LLDPE copolymer wherein the LLDPE copolymer is one having a density in the range of about 0.90 g/cc to about 0.925 g/cc, containing about 1% to about 20% by weight of a $C_4$-$C_8$ alkene comonomer.

8. The laminate of claim 4 wherein the ungrafted LLDPE copolymer has a density in the range of about 0.90 g/cc to about 0.925 g/cc and contains about 2% to about 15% by weight of 1-octene comonomer.

9. The laminate of claim 4 wherein the ungrafted LLDPE copolymer has a melt flow value, MFV, in the range of about 0.1 gm/10 min. to about 2000 gm/10 min. as measured according to ASTM D-1238(E).

10. The laminate of claim 4 wherein the ungrafted LLDPE copolymer has a melt flow value, MFV, in the range of about 0.5 gm/10 min. to about 120 gm/10 min.

11. The laminate of claim 4 wherein the ungrafted LLDPE copolymer has a melt flow value, MFV, in the range of about 0.7 gm/10 min. to about 40 gm/10 min.

12. The laminate of claim 4 wherein the ungrafted LDPE has a melt flow value, MFV, in the range of about 0.5 gm/10 min. to about 120 gm/10 min. according to ASTM D-1238(E) and a density in the range of about 0.90 g/cc to about 0.935 g/cc.

13. The laminate of claim 4 wherein the ungrafted LDPE has a MFV in the range of about 0.7 gm/10 min. to about 40 gm/10 min. and a density in the range of about 0.91 g/cc to about 0.93 g/cc.

14. The laminate of claim 4 wherein the HDPE, before grafting, has a MFV in the range of about 0.1 gm/10 min. to about 500 gm/10 min. and a density in the range of about 0.94 g/cc to about 0.965 g/cc.

15. The laminate of claim 4 wherein the HDPE, before grafting, has a MFV in the range of about 0.5 gm/10 min. to about 150 gm/10 min. and a density in the range of about 0.945 g/cc to about 0.960 g/cc.

16. The laminate of claim 4 wherein the succinic acid or succinic anhydride groups on the HDPE polymer claim comprise about 0.0001 to about 10 weight percent of the grafted HDPE polymer.

17. The laminate of claim 4 wherein the succinic acid or succinic anhydride groups on the HDPE polymer chain comprise about 0.01 to about 5 weight percent of the grafted HDPE polymer.

18. The laminate of claim 4 wherein the grafted HDPE comprises about 0.5 to about 99.5 weight percent of the blend.

19. The laminate of claim 4 wherein the grafted HDPE comprises about 3 to about 50 weight percent of the blend.

20. The laminate of claim 4 wherein the blend comprises grafted HDPE and ungrafted LDPE.

21. The laminate structure of claim 4 wherein at least one substrate comprises at least one material selected from the group consisting of iron, steel, chromium, aluminum, copper, nylon, non-oriented polypropylene (PP), oriented polypropylene (OPP), paper, wood, glass, or ethylene polymer.

22. The laminate structure of claim 4 wherein at least one substrate is a metal.

23. The laminate structure of claim 4 wherein at least one substrate is a plastic.

24. The laminate structure of claim 4 wherein at least one substrate is iron, steel, chromium, aluminum, or copper.

25. The laminate structure of claim 4 wherein at least one substrate is nylon, non-oriented polypropylene, or oriented polypropylene.

26. The laminate structure of claim 4 wherein at least one substrate is nylon or other polyamide resin.

27. The laminate structure of claim 4 wherein at least one substrate is an ethylene-vinyl alcohol copolymer.

28. The laminate of claim 4 wherein the blend comprises grafted HDPE and ungrafted LLDPE copolymer.

* * * * *

UNITED STATES PATENT AND TRADEMARK OFFICE
CERTIFICATE OF CORRECTION

PATENT NO. : 4,684,576

DATED : August 4, 1987

INVENTOR(S) : Ricky L. Tabor, et al.

It is certified that error appears in the above-identified patent and that said Letters Patent is hereby corrected as shown below:

In Col. 1, line 64, delete "ethylene".

Col. 4, line 48, "(pp)" should be -- (PP) --.

Col. 5, Table I, in column headed "OPP", "0.17" should be -- 0.71 --.

Signed and Sealed this

Seventeenth Day of May, 1988

Attest:

DONALD J. QUIGG

*Attesting Officer*    *Commissioner of Patents and Trademarks*